Dec. 30, 1947.  C. Z. MONROE  2,433,619
FRUIT-FEEDING MECHANISM FOR FRUIT JUICE MACHINES
Original Filed Jan. 15, 1941   2 Sheets-Sheet 1

INVENTOR
Charles Z. Monroe

BY J. Calvin Bright
ATTORNEY

Dec. 30, 1947.   C. Z. MONROE   2,433,619
FRUIT-FEEDING MECHANISM FOR FRUIT JUICE MACHINES
Original Filed Jan. 15, 1941   2 Sheets-Sheet 2

*INVENTOR:*
Charles Z. Monroe
BY
*ATTORNEY*

Patented Dec. 30, 1947

2,433,619

UNITED STATES PATENT OFFICE 2,433,619

FRUIT-FEEDING MECHANISM FOR FRUIT JUICE MACHINES

Charles Zienus Monroe, Detroit, Mich., assignor to Sealdsweet Sales Association, Tampa, Fla., a corporation of Florida Original application January 15, 1941, Serial No. 374,459. Divided and this application October 11, 1943, Serial No. 505,803

4 Claims. (Cl. 312—89)

The invention relates to a fruit juice extracting and dispensing machine and more particularly to a machine of this class which is automatic in its operation and adapted to extract the juice from a fruit and deliver the freshly extracted juice in a cup at the outside of the machine cabinet, a few moments after its extraction.

Such a machine is fully disclosed in the copending application, Serial No. 374,459, filed January 15, 1941, and issued December 26, 1944, as Patent No. 2,365,832, of which this application is a division.

The present invention is concerned more particularly with a fruit feeding means useable in connection with such an automatic machine, although certain features thereof can obviously find use in other relations.

It is an object of the invention to provide a reliable feed of the fruit from a supply hopper to, and its release from, a discharge opening one by one in timed relation to the other operations of the machine with which it is associated. Such reliable feed is in part achieved by the provision of a novel agitator in the throat of the supply hopper which prevents jamming of the fruit around said throat or discharge opening and by the novel means for releasing the discharged fruit one by one at each cycle of the machine from a gravity chute leading from the discharge throat of the supply hopper.

This and other objects and advantages and the manner in which they are attained will become clear from the following detailed description when read in connection with the drawings forming a part hereof.

Figure 1:
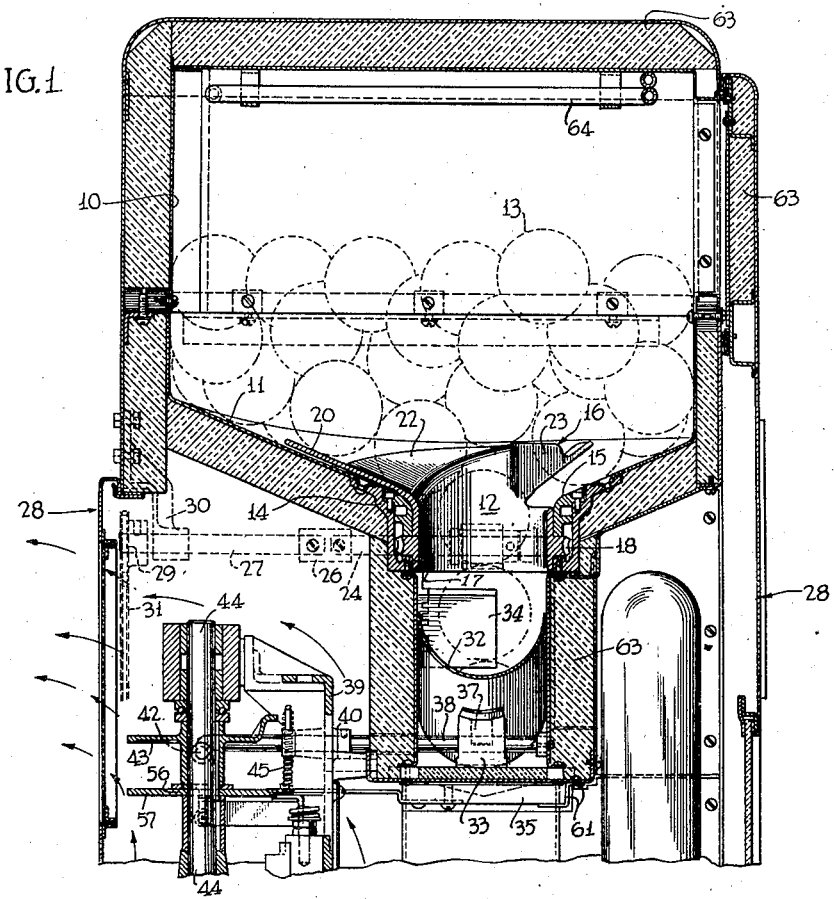
Fig. 1 is a central vertical sectional view through the top portion of such automatic machine showing the hopper and feeding mechanism of the invention.

By reference to the drawings, it will be seen that the hopper chamber, designated 10, has its bottom wall 11 inclined toward a central opening 12, so that the fruit, such as oranges 13, move by gravity toward said opening. An annular bearing is inset in this central opening, the bearing comprising an outer member 14 and an inner member 15, these two members being secured together and to the wall surrounding the opening, by screws or the like.

Within the bearing is mounted an agitator 16 having a ring bearing 17 rotatable within the annular bearing 14, 15, and from the outer face of this ring projects a worm gear 18. The opposite faces of the worm gear serve to hold the agitator vertically in place, being disposed between horizontal faces of the bearing.

Figure 2:
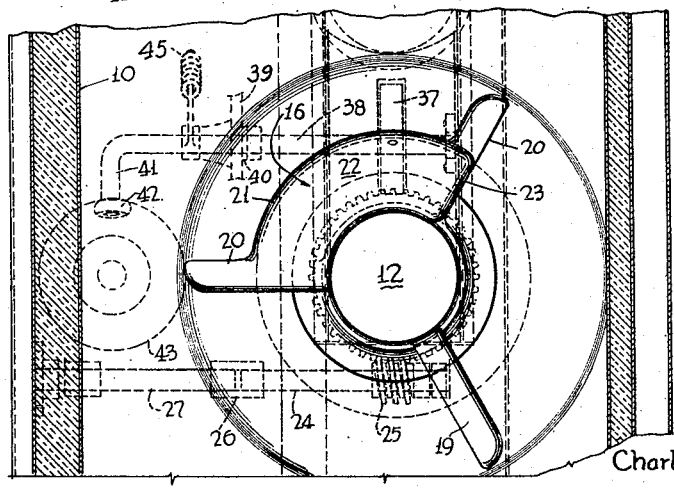
Fig. 2 is a detail plan view of the agitator mounted in the hopper bottom.

The agitator has three arms, as seen best in the plan view of Fig. 2, disposed substantially 120 degrees apart. One arm 19 extends freely from the bearing ring and is disposed along and conforms to the conical hopper bottom 11. The other two arms, as 20, extend similarly, their outer ends being free but their inner portions having connected thereto a segmental member 21 provided with an inclined upper face 22 rising from the floor of the hopper to a point some distance thereabove, and there terminating in a vertical face 23, Figs. 1 and 2.

The agitator keeps the fruit in the hopper from jamming at the opening, the arms and the inclined surface breaking up any tendency to jam during the rotation of the agitator and causing the fruit to pass down through the opening.

The agitator is rotated by a fore and aft worm shaft 24 carrying a worm 25 meshing with the worm gear 18. The worm shaft is supported by suitable bearings from the outer annular member 14. A coupling 26 connects the rear end of the shaft 24 to the inner end of an aligned shaft 27 carrying at its outer end, adjacent the rear wall of the cabinet, designated generally by 28, a sprocket gear 29. Inwardly of this gear the shaft is supported by a wide bearing on a bracket 30 secured to the rear wall of the cabinet. The sprocket gear 29, is driven from a motor (not shown) in the bottom of the machine cabinet through a chain and suitable reduction gearing. Thus it will be seen that the agitator is rotating at all times when the motor is running.

Figure 3:
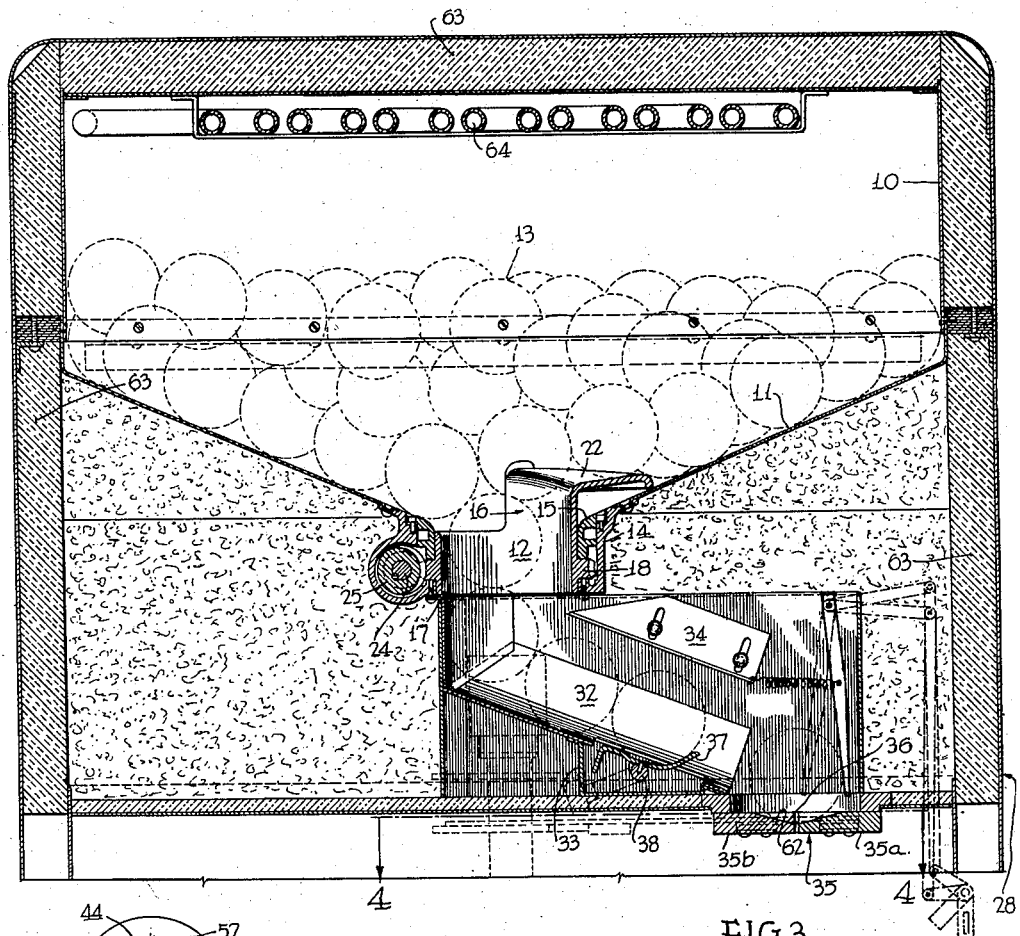
Fig. 3 is a vertical sectional view through the hopper and feeding mechanism, this view being taken at right angles to the view of Fig. 1.

An inclined sheet metal feeding trough 32 is secured at one end to vertical plates secured through lateral flanges, see Figs. 1 and 3, to the bottom of the bearing ring 14 and supported intermediate its ends by a bracket 33 and at its opposite end directly on the extreme bottom of the hopper chamber. The top of the trough may be formed (see Fig. 3) by plate 34, adjustably secured by a vertical flange to the rear wall of the passage containing the trough. The purpose of the adjustable plate is to allow fruit of different sizes to be fed without danger of piling up in the trough.

From the bottom of the trough the fruit rolls upon the discharge gate 35 and comes to rest in a depression 36 in the gate. To insure the feeding of but one fruit at a time to the gate, a one-by-one release mechanism is provided in the trough.

This release mechanism may comprise, as shown in Fig. 3, a bent strip of metal or release trip 37 secured intermediate its ends on a transverse pin 38 mounted adjacent the bottom of the trough, said trip being adapted to have its opposite ends projected into the bottom of the trough in the path of the fruit being fed. The forward arm of this trip is bent upwardly and the rear arm downwardly and when it is locked in the position shown in Fig. 3 it prevents the feed of a fruit to the gate.

When the trip is released, the weight of the fruit on its forward end causes it to swing on its pivot to project its rear arm into the path of the succeeding fruit and prevent its downward movement in the trough, until the trip is again swung to lower its rear end and raise its front end as shown in Fig. 3, when the next fruit feeds down and comes to rest against the upwardly inclined front arm of the trip.

The trip is controlled to feed a fruit to the gate at each cycle of the machine by having the pivot pin 38 rigid therewith and extended rearwardly through the top of the machine frame casting 39 and being there supported by a wide bearing 40. At its rear end it has a laterally extending arm 41 carrying a cam follower roller 42. This roller engages the under face of a cam 43 splined to the main cam shaft 44 of the machine, and bears against an annular face of said cam. A spring 45 operating on a lateral arm on the pin 38 carrying the follower roller 42 serves to hold the cam follower against the cam.

This cam normally maintains the trip for most of the revolution of the shaft in the position of Fig. 3, but releases it to turn and release the fruit resting against its foremost arm when the roller 42 drops onto a low portion of the cam. After the release, the cam immediately restores the trip to its original position allowing the next fruit to move down and rest on the raised fore arm of the trip.

Figure 4:
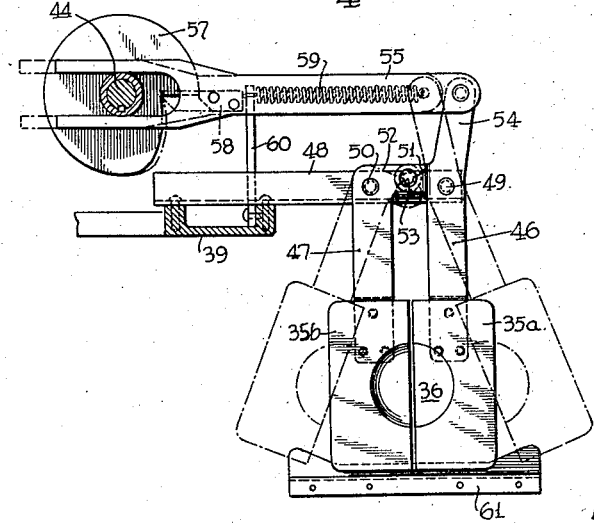
Fig. 4 is a detail plan view of the gate operating mechanism by which the fruit is finally released to the extracting mechanism of the machine.

Referring now to Figs. 1, 3 and 4, it will be seen that the discharge gate 35 comprises two similar parts 35a and 35b, the line of separation between the parts passing through the center of the depression 36 in which the fruit rests on the gate. These gate parts are mounted so as to permit them to move to a separated position to allow the fruit to drop between them to come to rest in the extracting mechanism of the machine (not shown).

The mechanism for so moving the gate parts may be in the nature of a scissors movement, the parts 35a and 35b being connected, respectively, at one of their ends to strips 46 and 47 which are pivotally supported, respectively, by a bracket 48 secured to the casting 39 and projecting laterally therefrom. They are pivoted to the bracket, respectively, by pivot pins 49 and 50 and have short arms 51 and 52 extending toward each other and pivoted together at 53, the pivot holes being preferably slightly elongated to prevent binding.

One of the strips, as 46, has an extension 54 beyond its pivot and this extension is pivotally connected to a link 55 which link has its opposite end bifurcated to straddle the cam shaft 44, and is guided by an annular groove 56 on the shaft just above the cam 57 splined to the shaft 44. A cam follower 58 projects downwardly from the link in position for engagement with the peripheral face of the cam. A tension spring 59 secured at one end to the link 55 and at its other end to a bracket 60 projecting rearwardly from the casting 39 holds the follower against the cam and since the follower rests on a high portion of the cam during the greater portion of the revolution of the cam shaft 44, the gate will be held closed, as shown in full lines, Fig. 4. A sudden drop is provided from the high point of the cam and when this is reached, the spring 59 acts to swing the gate parts to open position, as shown in dot and dash lines in Fig. 4, thus allowing the fruit resting thereon to drop to the extracting mechanism.

The free ends of the gate parts 35a and 35b are supported and guided by an angular support 61 secured to the bottom face of the compartment in which the trough 32 and opening 62 closed by the gate, is located.

As shown, the side to side compartment just referred to, the walls of the hopper 10 as well as the gate 35 are all insulated by a layer of insulation 63, and the inside of the hopper may be kept cool by a cooling coil, as 64, located in the top thereof. This insures the freshness of the fruit until fed from the hopper by the feeding means just described.

The motor for driving the agitator 16 may also drive the main cam shaft 44 through suitable reduction gearing. The cam shaft rotates once during a cycle of the machine, and it will be seen from the foregoing description that one fruit 13 is fed through the gate for each cycle. A very certain and efficient feeding mechanism has thus been provided.

The operation of the feeding means is believed clear from the foregoing description and further description of the operation would be mere redundancy.

It will be understood that changes and modifications may be made by those skilled in the art without departing from the main features of the invention, and it is intended to cover such changes and modifications in the appended claims.

What is claimed is:

1. In a machine of the class described, a hopper for containing a quantity of generally spherical fruits, said hopper having a conical bottom and a central opening, an agitator having an annular bearing rotatable in said opening, an arm projecting from said bearing into the hopper and a member having an inclined surface rising from the floor of the hopper and merging with said arm, and means for rotating said agitator to avoid jamming of the fruit about the opening.

2. In a machine of the class described, a hopper for containing a quantity of generally spherical fruits, said hopper having a conical bottom provided with a central opening of a diameter substantially greater than the diameter of said fruits, an agitator having an annular portion mounted to rotate in said opening and equally spaced arms projecting from said annular portion into said hopper, said arms lying close to the conical bottom and a member having an inclined surface extending between the inner parts of at least two of said arms and means for rotating said agitator to avoid jamming about the opening.

3. In a machine of the class described, a hopper for containing a quantity of fruits having its bottom wall surrounding a central discharge opening and provided with a conical inside surface, and an agitator having a ring bearing in said opening, and spaced arms lying close to said surface extending from said ring bearing and a segmental member having an inclined surface connecting the inner portion of at least two of said arms.

4. In a machine of the class described, a fruit hopper, a horizontally arranged gate having fruit-locating means thereon and normally closing said hopper, means for feeding a fruit onto the gate where it is held by said locating means, said gate comprising parts pivoted to swing in opposite directions to drop a fruit resting thereon between them, and means for actuating said gate.

CHARLES ZIENUS MONROE.

REFERENCES CITED

The following references are of record in the file of this patent:

UNITED STATES PATENTS

| Number | Name | Date |
| --- | --- | --- |
| 1,619,999 | Wright | Mar. 8, 1927 |
| 2,187,568 | Gurley | Jan. 16, 1940 |
| 1,013,674 | Millard | Jan. 2, 1912 |
| 1,701,869 | Woods | Feb. 12, 1929 |
| 929,568 | Davis | July 27, 1909 |
| 2,058,637 | Scott | Oct. 27, 1936 |
| 655,502 | Messinger | Aug. 7, 1900 |
| 2,221,704 | Farley | Nov. 12, 1940 |